US009544056B2

(12) United States Patent
Cameirao et al.

(10) Patent No.: US 9,544,056 B2
(45) Date of Patent: Jan. 10, 2017

(54) METHOD OF PROCESSING A DIGITAL SIGNAL FOR TRANSMISSION, A METHOD OF PROCESSING AN OPTICAL DATA UNIT UPON RECEPTION, AND A NETWORK ELEMENT FOR A TELECOMMUNICATIONS NETWORK

(71) Applicant: Alcatel Lucent, Boulogne Billancourt (FR)

(72) Inventors: Pedro Cameirao, Cascais (PT); Jean-Francois Jamond, Nozay (FR); Alberto Lometti, Vimercate (IT); Laurent Keuer, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 28 days.

(21) Appl. No.: 14/362,721

(22) PCT Filed: Nov. 5, 2012

(86) PCT No.: PCT/EP2012/004605
§ 371 (c)(1),
(2) Date: Jun. 4, 2014

(87) PCT Pub. No.: WO2013/083222
PCT Pub. Date: Jun. 13, 2013

(65) Prior Publication Data
US 2014/0355991 A1 Dec. 4, 2014

(30) Foreign Application Priority Data
Dec. 5, 2011 (EP) .................................... 11290558

(51) Int. Cl.
*H04B 10/2575* (2013.01)
*H04B 10/27* (2013.01)
(Continued)

(52) U.S. Cl.
CPC .......... *H04B 10/2575* (2013.01); *H04B 10/27* (2013.01); *H04J 3/1617* (2013.01);
(Continued)

(58) Field of Classification Search
None
See application file for complete search history.

(56) References Cited

U.S. PATENT DOCUMENTS 7,653,083 B2   1/2010 Liu et al.
2007/0091896 A1   4/2007 Liu
(Continued)

FOREIGN PATENT DOCUMENTS

CN   101932002 A   12/2010
EP   2 061 159 A1   5/2009
(Continued)

OTHER PUBLICATIONS

China Telecom, Huawei, "CPRI over OTN requirement," International Telecommunication Union, Telecommunication Standardization Sector, Study Period 2009-2012, COM 15-C 471-E, pp. 1-3, Sep. 2009.
(Continued)

*Primary Examiner* — Darren E Wolf
(74) *Attorney, Agent, or Firm* — Fay Sharpe, LLP

(57) ABSTRACT

A method of processing a digital signal for transmission is provided comprising digital data frames, by compressing the digital data frames; and generating an optical data unit for transmission comprising multiple of the compressed digital data frames. The optical data unit is configured for transport by an Optical Transport Network, OTN.

13 Claims, 9 Drawing Sheets

(51) Int. Cl.
  *H04J 14/02* (2006.01)
  *H04J 3/16* (2006.01)
  *H04W 88/08* (2009.01)
  *H04W 88/18* (2009.01)
  *H04W 92/20* (2009.01)

(52) U.S. Cl.
  CPC ............ *H04J 3/1652* (2013.01); *H04J 14/02* (2013.01); *H04J 2203/006* (2013.01); *H04J 2203/0082* (2013.01); *H04W 88/085* (2013.01); *H04W 88/181* (2013.01); *H04W 92/20* (2013.01)

(56) References Cited

U.S. PATENT DOCUMENTS

2007/0116046 A1  5/2007  Liu et al.
2013/0058655 A1  3/2013  Okubo et al.

FOREIGN PATENT DOCUMENTS

| EP | 2 416 506 A1 | 2/2012 |
| JP | 2008-506321 A | 2/2008 |
| WO | WO 2009/143176 A2 | 11/2009 |
| WO | WO 2011/148472 | 12/2011 |

OTHER PUBLICATIONS

International Search Report for PCT/EP2012/004605 dated Feb. 14, 2013.
China Mobile Communication Corp., "The Building of UniPON Networks," Dec. 2, 2009, pp. 1-21, URL, http://cms.comsoc.org/SiteGen/Uploads/Public/Docs_Globecome_2009/Huang.pdf.
Li, Han,m "UniPON Transport Solution for C-RAN," Apr. 23, 2010, pp. 1-11, URL, http://www.labs.chinamobile.,com/article_download.php?id=63226&rid=34575.
China Mobile Research Institute, C-RAN The Road Towrds Green RAN White Paper Version 2.5, Oct. 2011, pp. 1-44, URL, http://;labs.chinamobile.com/cran/wp-content/uploads/CRAN_white_paper_v2_5EN.pdf.
Domenico Di Mola, "Photonic Integrated Technologies for Optical Backhauling," 2011 IEEE, Alcatel-Lucent, Optics Division, Italy.

BBU CENTRALIZATION

BBU CENTRALIZATION / BBU CAPACITY EXPANSION

US 9,544,056 B2

METHOD OF PROCESSING A DIGITAL SIGNAL FOR TRANSMISSION, A METHOD OF PROCESSING AN OPTICAL DATA UNIT UPON RECEPTION, AND A NETWORK ELEMENT FOR A TELECOMMUNICATIONS NETWORK

FIELD OF THE INVENTION

The present invention relates to telecommunications, in particular to wireless telecommunications.

DESCRIPTION OF THE RELATED ART

In many wireless base stations, base band units (BBUs) are separate and physically remote from remote radio-heads (RRHs). In these solutions the radio-frequency front end and the analog-to-digital interface are part of a remote radio-head (RRH). An RRH is connected to a base band unit (BBU) via a digital transport network. Digitised base band complex inphase (I) and quadrature phase (Q) samples are transported over the transport network.

As the industry standard, the Common Public Radio Interface (CPRI) scheme has been used to connect remote radio-heads (RRHs) to base band units (BBUs). It allows different network architectures and is based on Time Division Multiple Access (TDMA). CPRI frames transport uncompressed I/Q samples. Using CPRI terminology, a remote radio head is a Radio Equipment (RE) and a base band unit is a Remote Equipment Controller (REC).

A known way to connect a remote radio-head (RRH) to a base band unit is to use optical fibres as point-to-point links. Typically, as a base band unit controls any remote radio-heads, there may be many fibres to each base band unit and the available bandwidth is not used efficiently. Another known approach is to use optical multiplexing so as to reduce the number of fibres required.

SUMMARY

The reader is referred to the appended independent claims. Some preferred features are laid out in the dependent claims.

An example of the present invention is a method of processing a digital signal for transmission comprising digital data frames, by compressing the digital data frames; and generating an optical data unit for transmission comprising multiple of the compressed digital data frames. The optical data unit is configured for transport by an Optical Transport Network, OTN.

Preferred embodiments provide aggregation and concentration of digital radio data at a wireless cell site for transmission via an OTN. In preferred embodiments up to eighteen remote radio-heads are connectable to a base band unit via the OTN. Preferably the digital data frames are Common Public Radio Interface (CPRI) data frames. The digital data frames are compressed and aggregated into up to two 10 Gigabit G.709 frames, namely ODU2, and transmitted through the OTN. The OTN may be, for example, a Passive Optical Network (PON), for example a 10 Gigabit Passive Optical Network (10 GPON), a Wave Division Multiplex Passive Optical Network (WDM PON), a WDM overlay to a 10 GPON, a CDWM optical ring or a DWDM optical ring.

Preferred embodiments provide compression of some radio data flows and aggregating them inside an optical flow to make good use of bandwidth. The optical flow can be transmitted through any type of Optical Transport Network (OTN). In preferred embodiments the number of point to point links and the number of wavelengths used is small.

In preferred embodiments, it is possible to switch data frames from/to multiple remote radio heads and base band units. This is advantageous for pooling processing resources, managing the network in the event of faults, and load sharing.

Another aspect of the present invention is a method of processing an optical data unit upon reception from an Optical Transport Network, OTN, by splitting the optical data unit into multiple compressed digital data frames; and decompressing each of the compressed digital data frames.

In preferred embodiments, broadly reverse functionality is provided for reception from the OTN, as was provided for transmission to the OTN.

A further aspect of the present invention is a network element for a telecommunications network. The element comprises: a compressor configured to compress digital data frames; a generator configured to generate a first optical data unit for transmission comprising multiple of the compressed digital data frames, the first optical data unit being configured for transport by an Optical Transport Network, OTN; a processor configured to split a second optical data unit upon reception from an Optical Transport Network, OTN, into multiple compressed digital data frames; and a decompressor configured to decompressing each of the compressed digital data frames from the second optical data unit so as to provide digital data frames.

BRIEF DESCRIPTION OF THE DRAWINGS

Embodiments of the present invention will now be described by way of example and with reference to the drawings, in which.

DETAILED DESCRIPTION

Figure 1:
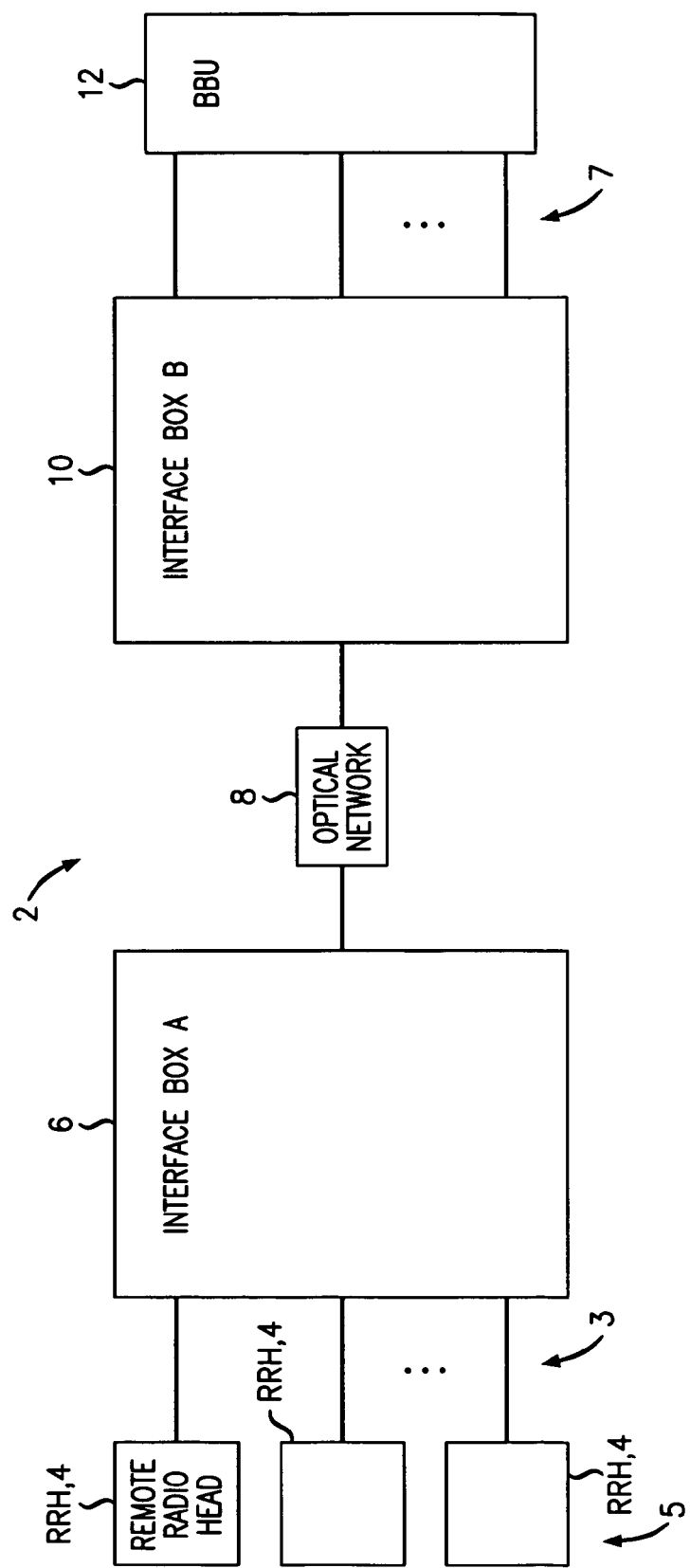
FIG. 1 is a diagram illustrating a system including remote radio-heads (RRH) and a base band unit (BBU), an Optical Transport Network (MN), and first and second interface boxes.

As shown in FIG. 1, the example system 2 includes multiple remote radio-heads (RRH) 4, three of which are shown for simplicity, each connected by one or two respective links 3 to a first interface box 6 to an Optical Transport Network (OTN) 8. The OTN 8 is also connected to a second interface box 10 which is connected to a base band unit (BBU) 12 by a number of links 7 corresponding to the number of links 3 from the first interface box 6 to the remote radio heads 4. In this example, the remote radio heads 4 are located at a shared cell site 5.

Remote Radio-Head (RRH) and Base Band Unit (BBU)

In the examples, the remote radio-head (RRH) does not perform BBU functionality, for example does not perform physical layer processing that is specific to any particular wireless technology. Furthermore, in this example no control signalling is exchanged between the remote radio-heads and base band units.

Figure 2:
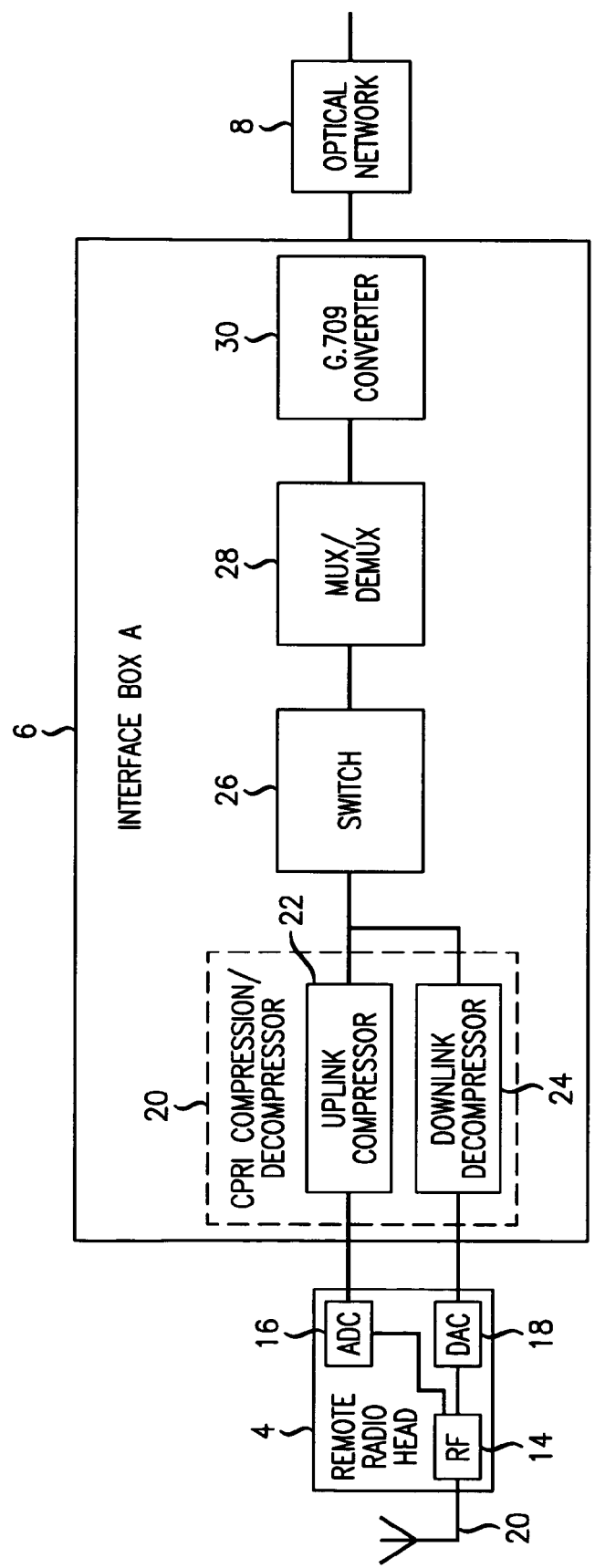
FIG. 2 is a diagram illustrating in more detail the first interface box shown in FIG. 1.

As shown in FIG. 2, each remote radio head 4, one of which is shown for simplicity, includes conventional circuitry.

For example, on the uplink, the RRH 4 includes a radio-frequency front-end 14 and an analog-to digital converter (ADC) 16 that converts the received analog radio signal into digital I/Q sample form in a known data frame format consistent with the Common Public Radio Interface (CPRI) Standard. By the way, in this example, the known CPRI basic frame format is used, illustrated on the left hand side of FIG. 3. (In other examples, other known CPRI frame formats in which to carry I/Q data may be used instead). The CPRI frames are provided to the first interface box 6 for data transmission via the OTN 8 and second interface box 10 to the base band unit 12. This is described in more detail later below.

Conversely on the downlink, the BBU 12 includes conventional circuitry namely a transmitter 18 which generates I/Q samples in data frames of CPRI format. These frames are provided to the second interface box 10 for data transmission via the OTN 8 and first interface box 6 to the remote radio-head (RRH) 4. The conventional remote radio-head (RRH) includes a digital to analog converter (DAC, not shown in FIG. 2, but shown in FIG. 6) to convert the signal to radio frequency signals transmitted via antenna 20.

The RRH radio frequency front end, ADC, DAC and the BBU processing are known, there being nothing in those subsystems implemented to accommodate compression and packing into G.709 ODUs for transport over the Optical Transport Network (OTN) nor unpacking and decompression to provide data in CPRI frame format once more.

Optical Transport Network (OTN)

The Optical Transport Network (OTN) is one in accordance with the ITU-T Recommendation G.709 standard as at the first filing date of this patent application. The OTN is G.709 compliant.

In other examples, the OTN may be a Passive Optical Network (PON), for example a Gigabit Passive Optical Network (GPON), Ethernet Passive Optical Network (EPON) or Wave Division Multiplex Passive Optical Network (WDM PON).

In other examples, the OTN may be a Fibre-to-the-x (FTTx) infrastructure. In other examples the OTN may be a ring such as a WDM ring, for example a Course Wave Division Multiplexing (CWDM) ring or a Dense Wave Division Multiplexing (DWDM) ring.

In further examples the OTN may be based on point-to-point (P2P) fibres.

In the OTN standards there are several standardised line rates, one of which is denoted Optical Transport Unit 2 (OTU2) which is approximately 10.78 Gigabits/second. OTU2 may be considered a data structure into which another data structure, namely an Optical Data Unit 2 (ODU2) is mapped. The ODU2 signal is a server layer signal for client signals. An ODU2 may transport a stream of packets, such as Ethernet, MPLS, Internet Protocol, or Common Public Radio Interface (CPRI) packets.

Interface Boxes

The interface boxes are bi-directional; however, it will be noted that uplink and downlink processing for transmission by the OTN operate in essentially the same manner. Similarly, uplink and downlink processing upon reception from the OTN operates in essentially the same manner. Accordingly, basically speaking, a single instance of processing for transmission by the OTN (namely uplink) and a single instance of processing upon reception from the OTN (namely uplink) will be described for the sake of brevity.

In this example, Uplink denotes the direction towards the base band unit. Downlink denotes the direction towards the RRH.

As shown in FIG. 2, the interface box 6 connected to the remote radio-heads (RRH) 4 includes a CPRI compressor/decompressor 20 which, in this example, may be considered to consist of an uplink compressor 22 and a downlink decompressor 24. The uplink compressor 22 is connected to the ADC 16 of the RRH 4. The downlink decompressor 24 is connected to the DAC 18 of the RRH 4.

The compressor 22 and decompressor 24 are connected to a switch 26 which is connected to a multiplexer/demultiplexer (MUX/DEMUX) 28 which is connected to a G.709 converter 30.

Figure 3:
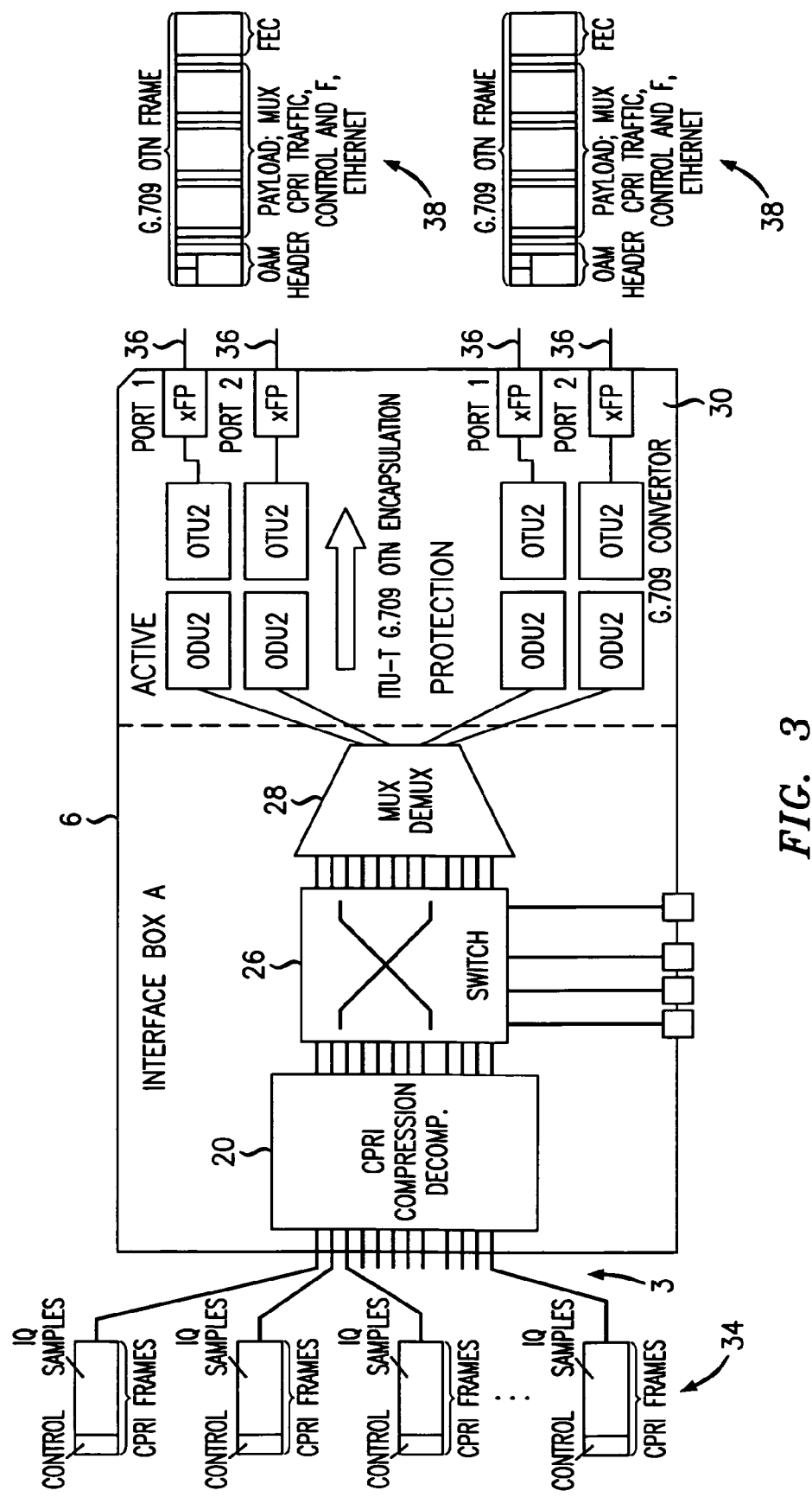
FIG. 3 is a diagram illustrating in further detail the first interface box shown in FIG. 2.

FIG. 3 show the interface box 6 in more detail. As shown in FIG. 3, in this example CPRI frames 34 are input via twelve CPRI input links 3 into the CPRI compressor/decompressor 20. There are twelve links between the CPRI compressor/decompressor 20 and a switch 26 that has twelve links to the MUX/DEMUX 28. The CPRI links each operate at a local CPRI rate 2.7. In this example, each remote radio head 4 provides one or two CPRI links to the first interface box 6.

For completeness, we mention here that various numbers of CPRI links are envisaged. In another embodiment, for example, eighteen links are provided used by multiple radio heads that each use one or two of the CPRI links. Of course, the skilled reader will appreciate that, in other examples, radio heads may be connected to an interface box using different numbers of CPRI links, and/or different numbers of remote radio heads may be connected to the interface box. The skilled reader will also understand that in some further embodiments more than one remote radio head may be connected to a CPRI link, for example by being daisy-chained.

The switch 26 and MUX/DEMUX 28 act to control to which Optical Data Unit ODU2 the CPRI frames are directed.

We now describe the compression in more detail before describing how the compressed CPRI frames are converted into ODU2 frames for transmission by the OTN.

Compression

Figure 4:
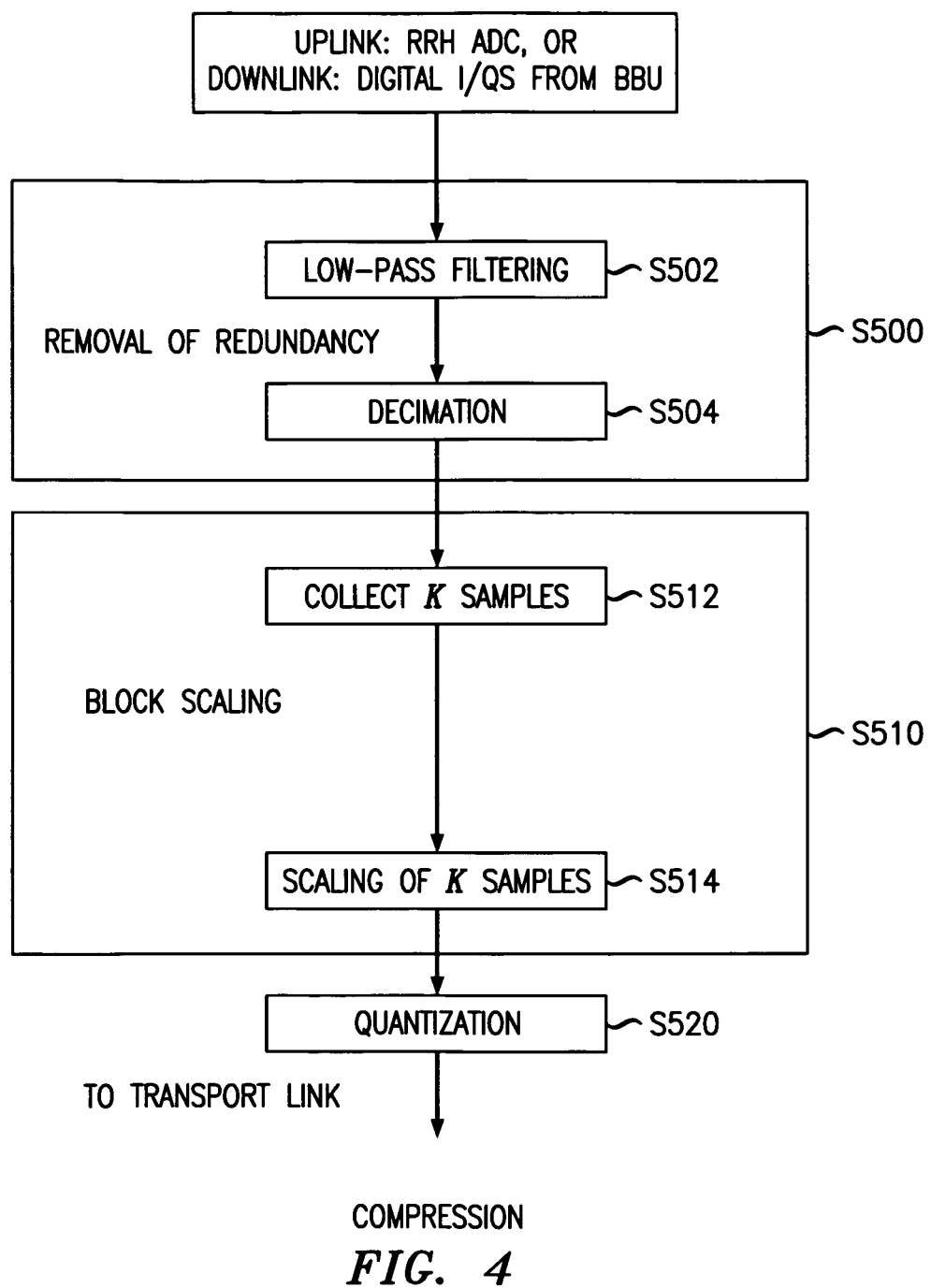
FIG. 4 is a flow-chart illustrating compression of CPRI formatted radio data.

FIG. 4 is a flow chart showing the compression that occurs in compressor 22 for example). As shown, the compression involves three main processes, namely removal of redundancies in the spectral domain S500, block scaling S510 and quantization S520. Each process will be described in detail below.

Removal of Redundancies in the Spectral Domain—S500

Conventionally, the sampling rate of the ADC, DAC and BBU processing is higher than the minimum required according to the Nyquist sampling theorem. For example, in a 10 MHz LTE system, the sampling rate is 15.36 MHz (both for the BBU processing and in the case of CPRI uncompressed transmission). Furthermore, for UMTS/HSPA as well as cdma2000/EV-DO, 2-time and 4-time oversampling is customary. This results in redundancies in the spectral or frequency domain. Namely, in the uncompressed form, a spectrally broader signal is transmitted than what may be necessary.

Consequently, process S500 removes these redundancies. As shown in FIG. 4, the removal process includes low-pass filtering S502 the digital base band signal followed by decimation S504. In one embodiment, these processes are performed in a streaming fashion, sample-by-sample. For example, in one embodiment, the filtering S502 is performed by a finite-impulse response (FIR) filter, and decimation S504 is performed by up- and down-sampling. The filtering S502 and decimation S504 will depend on the base band signal, and particularly, the frequency band and amount of oversampling.

Conceptually, this is not exclusive to a particular wireless technology (for example Universal Mobile Telecommunications System (UMTS), Long Term Evolution (LTE) etc.). Particular parameters (e.g., bandwidth and sampling rate) are specified for a given wireless technology. Furthermore, the low-pass filter parameters are selected empirically or by design choice to balance and/or optimize complexity-versus-performance tradeoff.

Block Scaling—S510

Block scaling may also be called block floating-point. Here, a block of K I/Q samples output from the decimation operation S504 are collected in step S512. The block of K I/Q samples are then divided by a scaling factor in step S514.

The scaling factor may be a fixed number of bits, the value of which may vary block-by-block.

For example, block scaling (step S510) is performed on a 24-sample block, with 16 bits used to represent the scaling factor. In this embodiment, in each block of K=24 samples, a sample with the largest absolute value is determined. That particular value is quantized with 16-bit resolution, and denoted as $A_m$. The corresponding corresponding scaling factor may be determined as shown by the equation below (where Nb denotes bit-resolution):

$$S=2^{Nb-1}/A_m.$$

Each sample in the block is then multiplied by the above scaling factor. This equation may also be used to determine the scaling factor in any of the described embodiments.

Also, the block length K is a design parameter and may be derived from a trade-off analysis between desired signal quality (e.g., EVM and ACPR) and transport data rates. In one embodiment, the block length K may be fixed. However, as will be discussed in greater detail below. The block length is not limited to being fixed. Instead, the block length may be dynamically and/or adaptively determined.

Because the scaling factor, and possibly the block length, may change, one or more of these parameters may be transmitted adding to overhead. For example, the scaling factor may be transmitted once every K I/Q samples. Lowering the block length K will lower the subsequent quantization error, while increasing the transmission overhead. Therefore, the block length K is a design parameter derived from the trade-off analysis between the required signal quality and transport data rates.

Quantization—S520

After the block scaling S510, I/Q samples are quantized using a quantizer with $N_b$-bit resolution per each complex component. In this example, the number of bits representing a sample is truncated to the $N_b$ most significant bits. This operation is performed sample-by-sample.

Alternatively, a simple linear (i.e., uniform) quantizer may be applied. However, application of a quantizer with the optimized distances between the quantization levels will result in lower quantization error, and improved signal quality. One example of a non-linear (i.e., non-uniform) quantizer is presented with respect to pseudo code (A) below. In that case, the quantization levels are optimized in in conjunction with the above block scaling.

Higher resolution will improve the signal quality (i.e., lower quantization noise), while increasing the transport data rates. Therefore, the resolution $N_b$ is a design parameter derived from the trade-off analysis between the required signal quality and data rates.

Note that different parameters may be used to achieve desired performance on the uplink and downlink. For example, higher quantizer resolution and shorter block length are expected in the uplink case because the uplink signal is expected to have a larger dynamic range, as well as additive noise and interference present.

Conversion of Compressed CPRI Frames to ODU2 Format

As shown in FIG. 3, directed by the switch 26 and MUX/DEMUX 28 multiple CPR frames are aggregated together and sent encapsulated within a single Optical Data Unit (ODU2). The switch 26 acts to direct the compressed CPRI frames. The MUX/DEMUX 28 acts to multiplex multiple Compressed CPRI frames into shared channels so that there are fewer outputs than inputs, and less bandwidth is used for transmission in consequence (in other words, less "lambda").

Figure 5:
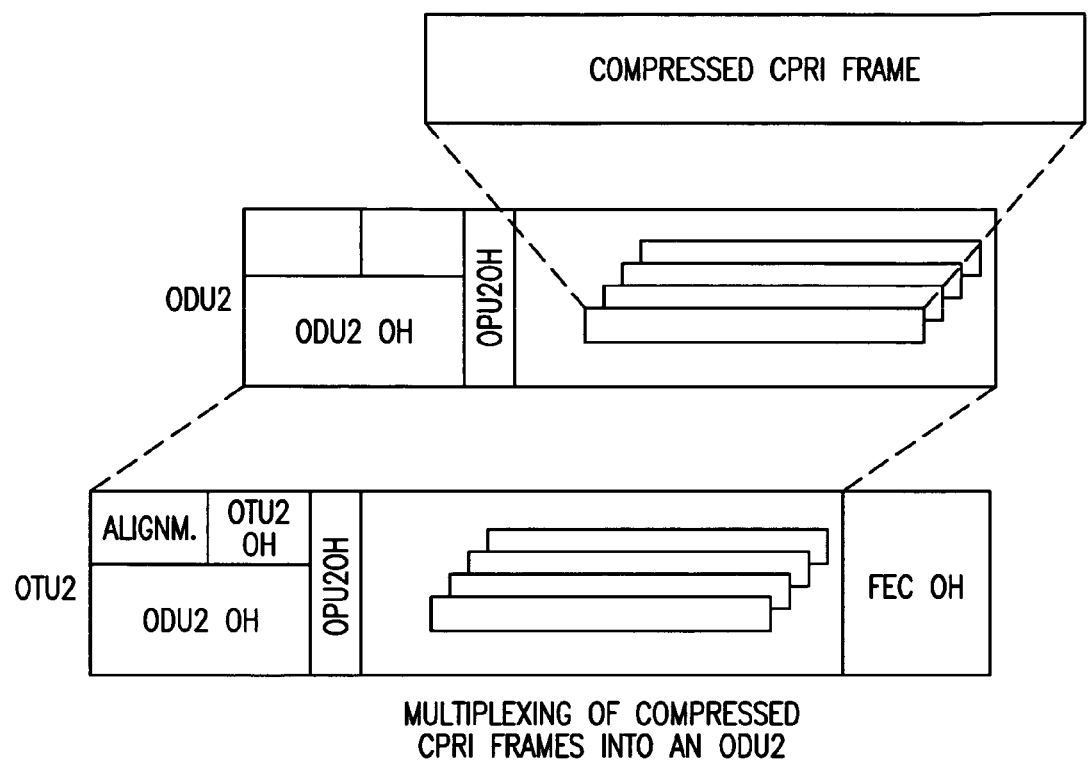
FIG. 5 is a diagram illustrating multiplexing and encapsulation of the compressed radio data into an optical data unit for transmission over the Optical Transport Network (OTN)

As shown in more detail in FIG. 5, once compressed, multiple CPRI frames from multiple of the links are inserted together into the payload of an ODU2 frame for transmission. This can be considered an "xCPRI framing" whereby multiple CPRI frames after compression are concatenated together then the resulting data is subject to G.709 encapsulation so as to provide an ODU2 frame.

The ODU2 frame includes ODU2 overhead and Optical Channel Payload Unit (OPU2) overhead in addition to the multiple CPRI frames. As shown in FIG. 5, additional alignment and overhead data is added and Forward Error Correction (FEC) is added, for transmission as an Optical Transport Unit (OTU2).

Referring back to FIG. 3, it will be seen that in this example the CPRI links and hence frames are concatenated into two output ODU2 and hence two OTU2 (denoted 38 in FIG. 3). These are denoted ACTIVE in FIG. 3. In addition for each OTU2 frame a duplicate frame is sent via a second path (denoted PROTECTION) for protection purpose to help ensure correct transmission. The OTU2s 34 are output via output ports 36 into the OTN network (not shown in FIG. 3).

By the way, Operations &Management (OAM) information (if any) that needs to be transmitted via the OTN between interface boxes is included in the control channels GCC1 or GCC2 in the ODU2.

Processing Upon Reception

Figure 6:
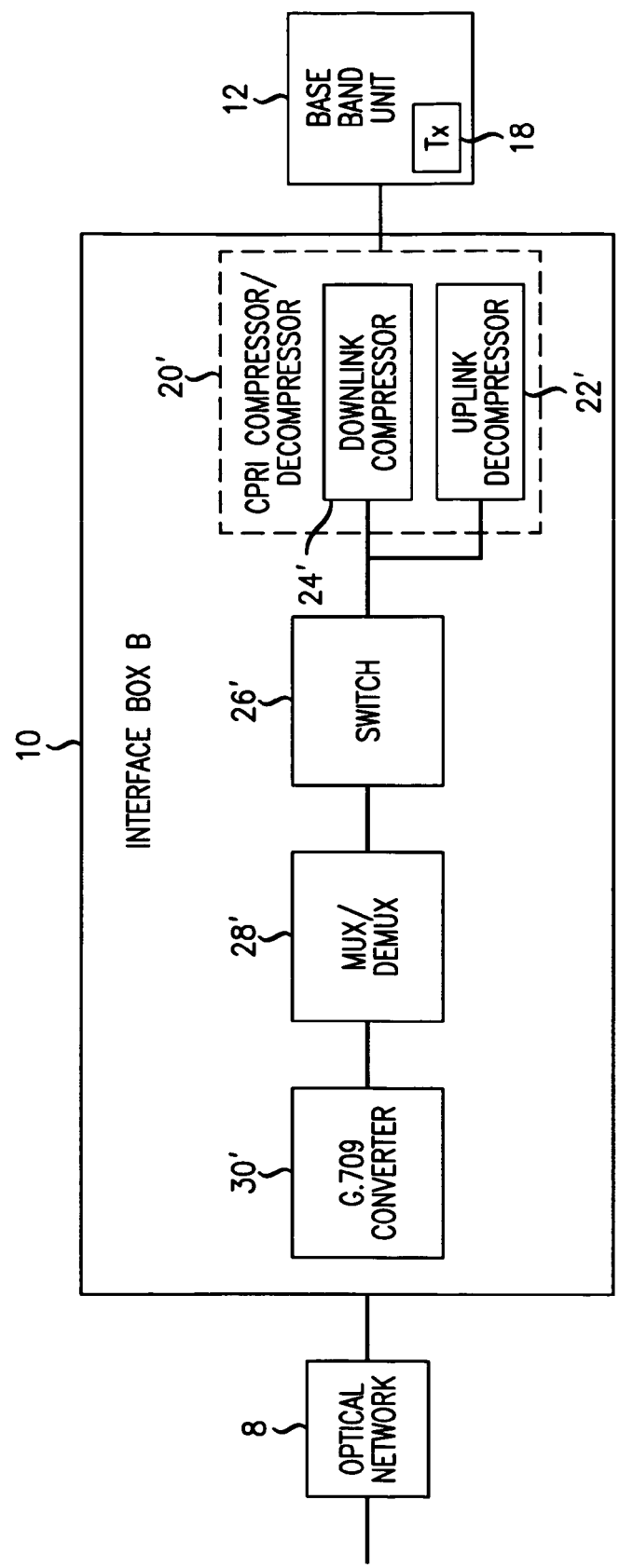
FIG. 6 is a diagram illustrating in further detail the second interface box shown in FIG. 1.

As shown in FIG. 6, the OTU2 frames are transported over the Optical Transport Network (OTN) 8 and received by the second interface box 10. The second interface box includes a G.709 converter 30' connected to a MUX/DEMUX 28' which is connected to a switch 26'. The switch is connected to an uplink decompressor 20' and a downlink compressor 22' of a CPRI compressor/decompressor 20'.

This second interface box 10 essentially acts in this uplink direction to reverse the processing steps undertaken in the first interface box 6. The G.709 converter 30' acts to de-encapsulate the concatenated compressed CPRI data by removing OTU2 and ODU2 headers, FEC etc. The resulting data stream is then demultiplexed in the MUX/DEMUX 28' to provide the compressed CPRI frames. The switch 26' then sends the compressed CPRI frames to the uplink decompressor 22'.

Decompression

Figure 7:
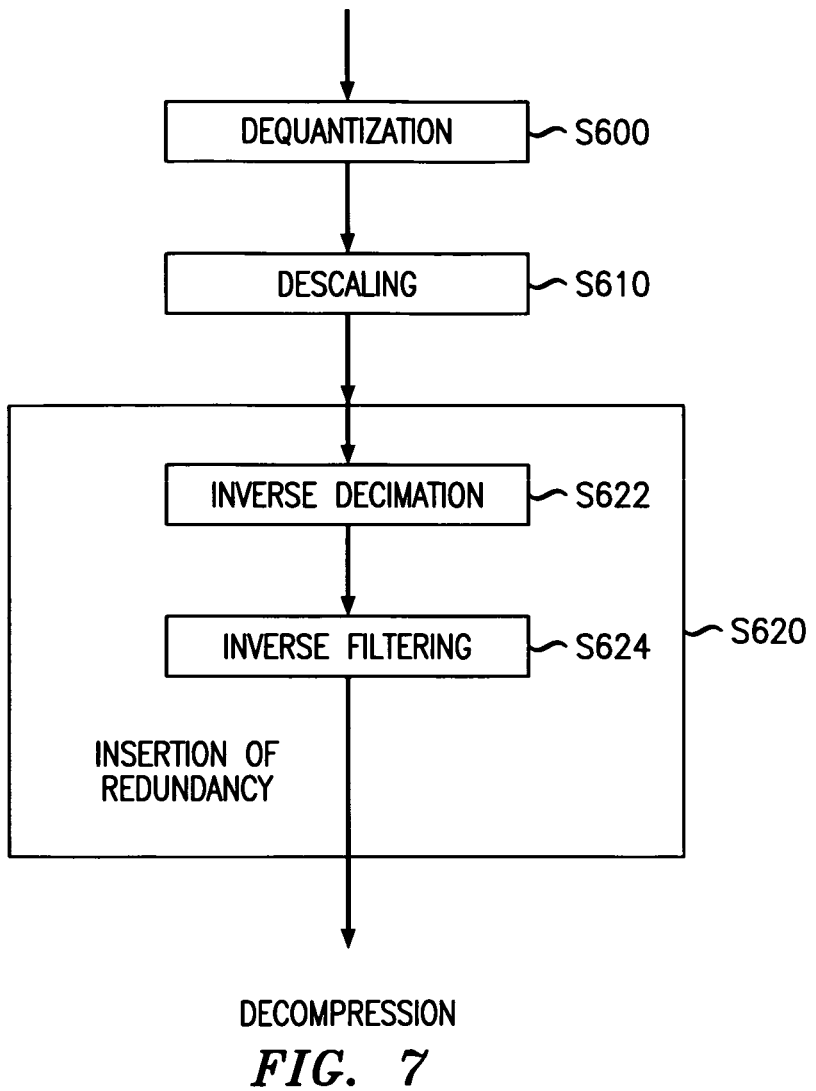
FIG. 7 is a diagram illustrating the decompression of radio data into CPRI formatted radio data.

As shown in FIG. 7, decompression involves three main processes: dequantization S600, descaling S610, and insertion of redundancies S620, i.e., up-sampling. Each process will be described below.

During dequantization S600, the inverse of the quantization operation is performed. Namely, the number of bits used to represent a sample is increased to the same resolution prior to quantization in step S520. In this embodiment, this is performed by adding zeros as least significant bits. Alternatively, the inverse of the quantization process conducted in step S520 may be performed. For example, the inverse of the pseudo code (A) shown below may be performed if quantization in Step S520 proceeds as set forth in pseudo code (A).

During descaling S610, a block of K samples from the dequantization S600 are collected and multiplied by the scaling factor.

During insertion of redundancies S620, each sample from the descaling S610 undergoes inverse decimation S622, which is the inverse of the decimation in step S504. Similarly, the resulting samples are inverse filtered in S624, where the "filtering" is the inverse of the filtering performed in step S502. This is an up-sampling procedure.

Subsequent Processing

After this demultiplexing and decompression, the decompressed CPRI frames are then passed to the conventional base band unit 12 via a corresponding number of CPRI links as between the remote radio heads 4 and first interface box 6. At the conventional base band unit 12, the receive base-band processing (i.e. physical layer processing is undertaken.

Handling of Alarms Due to Faulty Operation and Other Operations and Management Signalling For completeness, we would mention that the interface box 6 at the remote radio head side (and the interface box 10 at the base band unit 12 side) each include Ethernet ports (not shown). These ethernet ports are used to tunnel Ethernet data flow between the radio head side and the base band unit side, for example backhauling information or data collected on the radio head side. For example, this information is tunnelled by the interface box 6, either inside the OAM channel (control channels GCC1 or GCC2 of the Optical Data Unit ODU2) or multiplexed with the CPRI data inside the ODU2 payload, so as to be made available to the interface box 10 at the base band unit 12 side.

At the base band unit 12 side, similarly the interface box 10 also has Ethernet ports (not shown) which are used to connect to the base band unit 12 for control purposes.

Two Way Functionality

As mentioned previously the path from remote radio-head (RRH) to base band unit has been explained in detail, but there is also a path in the opposite direction, namely from base band unit to remote radio-head. These are denoted uplink and downlink respectively.

The interface boxes are bi-directional; however, it will be noted that uplink and downlink processing for transmission by the OTN operate in essentially the same manner. Similarly, uplink and downlink processing upon reception from the OTN operates in essentially the same manner. Accordingly, basically speaking, a single instance of processing for transmission by the OTN (namely uplink) and a single instance of processing upon reception from the OTN (namely uplink) has been described above for the sake of brevity.

Some Alternative Implementations

Figure 8:
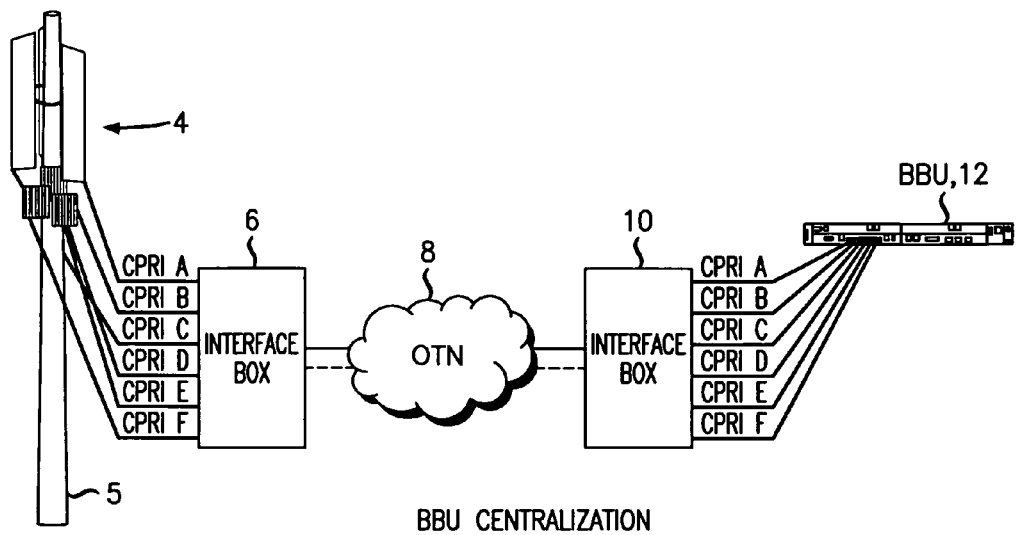
FIG. 8 is a diagram illustrating an example of switching by the interface boxes shown in FIG. 1 (switching is to a single BBU)
Figure 9:
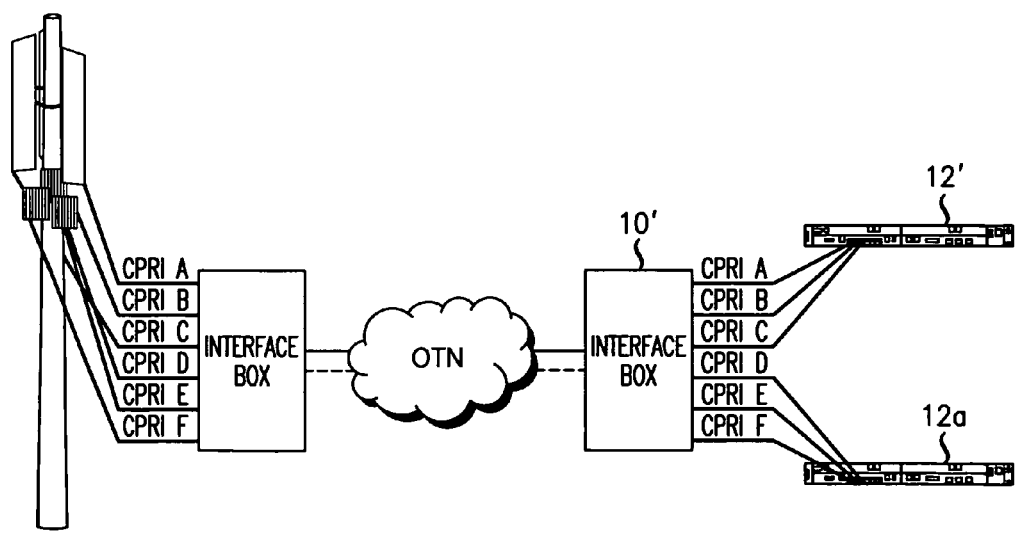
FIG. 9 is a diagram illustrating switching by the interface boxes in a second embodiment of the invention.

In the example described above with reference to FIGS. 1 to 7, a single first interface box 6 is connected to remote radio heads 4 of one cell site 5 and a single second interface box 10 is connected to a single base band unit 12 (this is illustrated in FIG. 8). However, alternatives are possible, for example as follows:

As shown in FIG. 9, the second interface box 10' is connected so that some of its outputs are to the base band unit 12' and others of its outputs are to a second base band unit 12a. This allows multiple base band units to be involved, readily expanding base band unit capacity.

Figure 10:
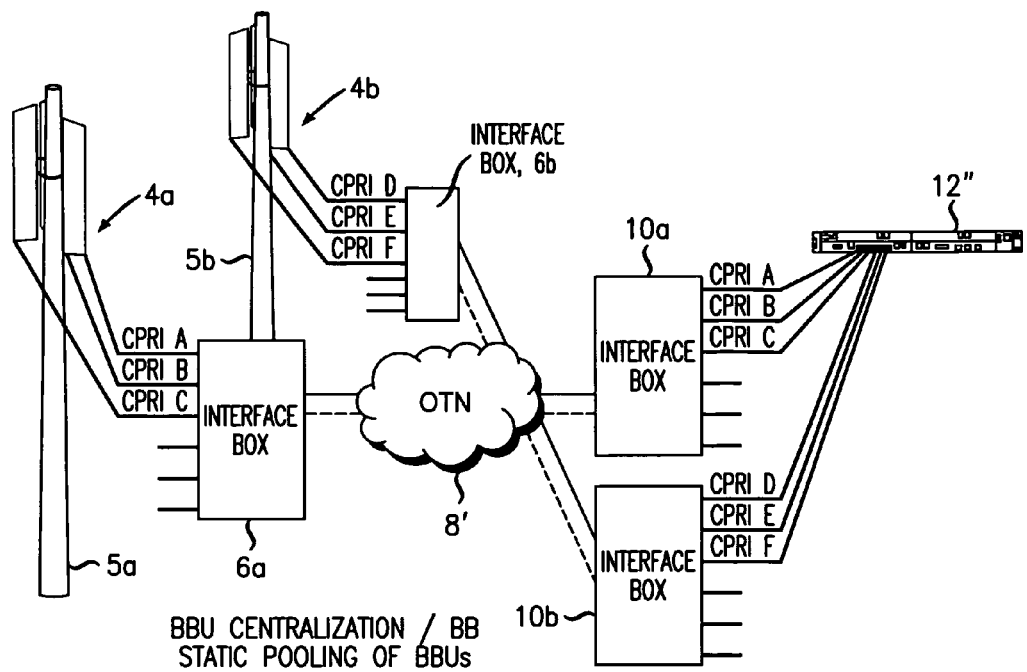
FIG. 10 is a diagram illustrating switching by the interface boxes in a third embodiment of the invention.

As shown in FIG. 10, two first interface boxes 6, 6a connect two sets of remote radio-heads (RRH) 4a, 4b from different cell sites 5a, 5b to the OTN 8' and two second interface boxes 10a, 10b both connect to a base band unit 12". The allocation of CPRI links to the base band unit 12" is static but the base band unit 12" is shared by both the first interface box 6a to second interface box 10a system, and the first interface box 6b to second interface box 10b system. Appropriate allocation of CPRI links to base band units requires knowledge of the statistical distribution of traffic and of the number of remote radio heads to be served.

Figure 11:
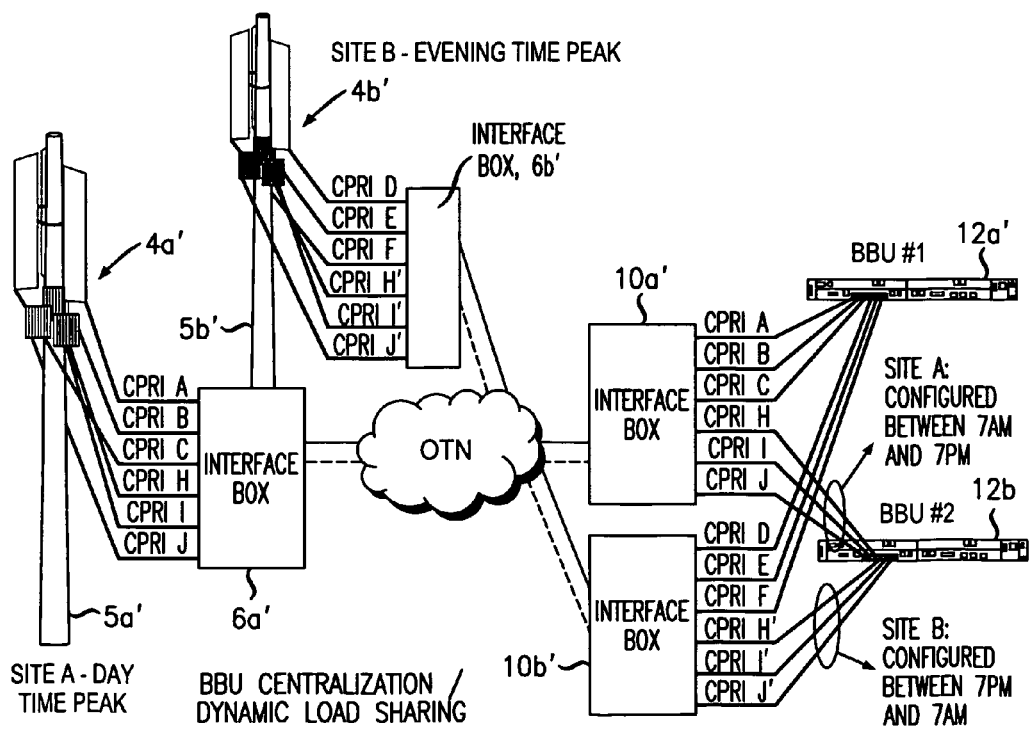
FIG. 11 is a diagram illustrating switching by the interface boxes in a fourth embodiment of the invention.

As shown in FIG. 11, in another scenario, a second base band unit 12b is shared between the two sets of remote radio-heads (RRH) 4a',4b' from different cell sites 5a',5b' according to the time of day. From 7 am to 7 pm (daytime), selected CPRI links H, I, J from a first remote radio-head (RRH) 4a' go to a second base band unit BBU#2 via the OTN whilst other selected CPRI links A, B, C from the first remote radio-head (RRH) 4a' go to the first BBU#1. Conversely, from 7 pm to 7 am (night-time) selected CPRI links H', I', J' from the second remote radio-head (RRH) 4b' go to a second base band unit BBU#2 via the OTN whilst other selected CPRI links D, E, F from the second remote radio-head (RRH) 4b' go to the first BBU#1. It can be considered that the first remote radio-head (RRH) 4a' is better served in the daytime whereas the second remote radio-head (RRH) 4b' is better served in the evening. This approach can be considered as dynamic load sharing between BBUs and RRHs by appropriate switching by the interface boxes 10a', 10b' between the OTN and BBUs.

The particular examples shown in FIGS. 9 to 11, involve a doubling-up of first and/or second interface boxes etc., however, in other examples any number of first interface boxes, second interface boxes, remote radio-heads (RRH) and base band units may be used.

It will be understood that further examples are possible. For example, two or more first interface boxes can be used to connect two or more remote radio heads, via the Optical Transport Network and a single second interface box, to a single base band unit.

In the event of a fault, as may be signalled in the ODU2, using GCC1 or GCC2 messaging, an interface box receiving the ODU2 can switch its outputs for fault management purposes, for example to avoid sending digital date frames to a known-to-be-faulty base band unit.

GENERAL

The above described examples involve CPRI, however in further examples other digital data formats may be used instead, for example Open Base Station Architecture Initiative (OBSAI) or Open Radio Initiative (ORI).

The example embodiments are applicable to different wireless technologies, for example 3GPP (Third Generation Partnership Project) Long Term Evolution (LTE), LTE-Advanced, Universal Mobile Telecommunications System (UMTS) such as High Speed Packet Access (HSPA), as well as on the uplink and downlink.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of processing a digital signal, including at least digital radio data frames, for transmission, the method comprising:
   compressing digital data frames, wherein the compressing comprises reducing redundancies in the digital data frames, scaling a block of samples output from the reducing by a scaling factor and quantising the scaled samples to produce scaled, compressed samples; and
   generating, via at least one processor, an optical data unit for transmission comprising multiple of the compressed digital data frames, said multiple of the compressed digital data frames being from multiple links and the optical data unit being configured for transport by an Optical Transport Network, OTN, wherein the compressed digital data frames are concatenated into a plurality of composite frames, and the composite frames are encapsulated to form a respective optical data unit and wherein the generation is by concatenating multiple of the compressed digital data frames into a composite frame and encapsulating the composite frame to form the optical data unit.

2. The method according to claim 1, in which the digital radio data frames are Common Public Radio Interfaces (CPRI), data frame, and the links are CPRI links.

3. The method of processing according to claim 1, in which the optical data unit is an ODU2 in accordance with ITU-T Recommendation G.709.

4. A method of processing an optical data unit upon reception from an Optical Transport Network, OTN, by
   splitting the optical data unit into multiple compressed digital data frames, wherein the splitting is by de-encapsulating the optical data unit to provide a composite data frame, and deconcatenating the composite data frame to provide the multiple compressed digital data frames; and
   decompressing the compressed digital data frames to provide decompressed digital radio data frames from multiple links, wherein the decompressing comprises dequantising received samples, descaling a block of the dequantised samples, and inserting redundancies into the descaled samples to produce the digital radio data frames.

5. The method of processing according to claim 4, further comprising:
   receiving multiple optical data units; and
   de-encapsulating the multiple optical data units that are received to provide respective multiple composite data frames, and
   de-concatenating the respective multiple composite data frames into a plurality of digital data frames.

6. The method of processing according to claim 4, in which the digital radio data frames are Common Public Radio Interfaces (CPRI), data frame, and the links are CPRI links.

7. The method of processing according to claim 4, in which the optical data unit is an ODU2 in accordance with ITU-T Recommendation G.709.

8. A network element for a telecommunications network, the element comprising:
   a compressor configured to compress digital radio data frames from multiple links wherein compressing comprises reducing redundancies in the digital data frames, scaling a block of samples output from the reducing by a scaling factor and quantisinq the scaled samples to produce scaled, compressed samples;
   a generator configured to generate a first optical data unit for transmission comprising multiple of the compressed digital data frames, the first optical data unit being configured for transport by an Optical Transport Network, OTN, wherein generation is by concatenating multiple of the compressed digital data frames into a composite frame and encapsulating the composite frames as a first optical data unit;
   a processor configured to split a second optical data unit upon reception from an Optical Transport Network, OTN, into multiple compressed digital data frames; and
   a decompressor configured to decompress the compressed digital data frames from the second optical data unit so as to provide digital radio data frames from multiple links, wherein decompressing comprises dequantising received samples, descaling a block of the dequantised samples, and inserting redundancies into the descaled samples to produce the digital radio data frames.

9. The network element according to claim 8, in which said splitting is by de-encapsulating the second optical data unit to provide a composite data frame, and deconcatenating the composite data frame to provide multiple of the compressed digital data frames.

10. The network element according to claim 8, in which each digital radio data frame is a Common Public Radio Interface, CPRI, data frame, the links are CPRI links and in which the optical data units are ODU2 in accordance with ITU-T Recommendation G.709.

11. A telecommunications network comprising a number of network elements according to claim 8 connected between an Optical Transport Network and a number of base band units, in which the number of base band units is greater than the number of network elements.

12. The telecommunications network comprising a number of network elements according to claim 8 connected between an optical Transport Network and a number of base band units, in which the number of base band units is less than the number of network elements.

13. The telecommunications network comprising a plurality of network elements according to claim 8 connected between the Optical Transport Network and a plurality of base band units, in which at least one of the network elements is configured to be switchably connectable to a plurality of the base band units dependent upon time of day.

* * * * *